(12) United States Patent
Rodgers et al.

(10) Patent No.: US 11,433,837 B1
(45) Date of Patent: Sep. 6, 2022

(54) BUMPER WITH SELECTIVELY ATTACHABLE LIGHT BARS

(71) Applicant: Deist Industries, Inc., Hadley, PA (US)

(72) Inventors: Brody Rodgers, Harrisville, PA (US); Allen Frost, Linesville, PA (US); Jeff Burns, Waterford, PA (US)

(73) Assignee: DEIST INDUSTRIES, INC., Hadley, PA (US)

( * ) Notice: Subject to any disclaimer, the term of this patent is extended or adjusted under 35 U.S.C. 154(b) by 0 days.

(21) Appl. No.: 17/222,338

(22) Filed: Apr. 5, 2021

(51) Int. Cl.
*B60R 19/50* (2006.01)
*B60D 1/52* (2006.01)
*B60D 1/58* (2006.01)

(52) U.S. Cl.
CPC ............. *B60R 19/50* (2013.01); *B60D 1/52* (2013.01); *B60D 1/58* (2013.01); *B60R 2019/505* (2013.01)

(58) Field of Classification Search
CPC ............ B60D 1/187; B60D 1/52; B60D 1/58
See application file for complete search history.

(56) References Cited

U.S. PATENT DOCUMENTS

| 9,821,616 | B1* | 11/2017 | Sayers | B60D 1/187 |
| 10,513,219 | B1* | 12/2019 | Hassler | B60D 1/58 |
| 2004/0156205 | A1* | 8/2004 | Pisciotti | B60Q 1/305 |
| | | | | 362/540 |
| 2016/0167568 | A1* | 6/2016 | Salami, Jr. | B60Q 1/0088 |
| | | | | 362/543 |
| 2016/0347247 | A1* | 12/2016 | Espey | B60Q 1/52 |
| 2017/0114966 | A1* | 4/2017 | McCurdy | B60D 1/62 |
| 2017/0120838 | A1* | 5/2017 | Hare | B60Q 1/0483 |
| 2017/0259730 | A1* | 9/2017 | Carroll | B60P 3/18 |
| 2017/0334347 | A1* | 11/2017 | Wilkins | B60Q 1/18 |
| 2019/0126809 | A1* | 5/2019 | Wymore | B60Q 1/0035 |

OTHER PUBLICATIONS

Buyers Products 1809036 Hitch Plate (Amazon.com, Jun. 30, 2021) https://www.amazon.com/Buyers-Products-1809036-Hitch-Plate/dp/B01CIO6GP8.
Buyers Products 1809030B Hitch Plate, 1 Pack (Amazon.com, Jun. 30, 2021) https://www.amazon.com/Buyers-Products-1809030B-Hitch-Plate/dp/B06ZYMYMM2.

* cited by examiner

*Primary Examiner* — Zheng Song
(74) *Attorney, Agent, or Firm* — Emerson, Thomson & Bennett, LLC; Roger D. Emerson

(57) ABSTRACT

Provided in this disclosure is a vehicle bumper with a main bumper having an elongated body portion. The elongated body portion has a first and second ends. Mounting flanges are formed integrally and perpendicularly around a respective periphery of the first and second ends. First and second detachable light bars are provided that each include a mating mounting flange formed around a periphery of each light bar, configured for abutting engagement with the respective mounting flange of the main bumper. A pair of slots are formed along a top edge of each mounting flange, into which a pair of bolts are slid from bore holes in the respective mating mounting flanges. A pair of bolt holes are formed along a bottom edge of each mounting flange into which a pair of bolts are slid through from bore holes in the mating mounting flanges.

18 Claims, 8 Drawing Sheets

BUMPER WITH SELECTIVELY ATTACHABLE LIGHT BARS

I. BACKGROUND

A. Technical Field

The present invention pertains to the field of bumpers for vehicles. In particular, the present invention relates to the field of customizable bumpers that can be selectively configured by an end user to suit the specific needs of a truck.

B. Description of Related Art

Trucks are typically sold with standard factory components such as bumpers, and can include option packages with additional components that can enable certain specific functions suited to the needs of the end user. However, there are a myriad of specific needs for a variety of different end users. Factory standards and options cannot meet every specific user's needs. There is a market for vehicle customization to accommodate these various needs in which modified components can be provided to improve performance of a vehicle and provide functions not available in standard or optional factory components.

Customizing operations can require personnel to adapt and fabricate their own components for use with a bumper. This can be time consuming and material-intensive and thus expensive to the end user. Also such fabricated components do not necessarily comply with established safety standards. This can result in potential liability in the event of the failure of a component. Moreover, customizing operations often result in a monolithic component that is made for the specific needs at the time of the customer ordering the component. Thus, such components usually cannot be subsequently modified to accommodate any additional changing needs of the end user.

Another problem arises with detachable components that can be attached to a customizable bumper. Such components can be supported by a series of bolts in which a first worker supports the components for alignment against the bumper while a second worker inserts the bolts into the aligned holes. This can be a two-worker procedure and can result in difficulty in aligning the components and also difficulty in inserting the bolts while maintaining alignment.

II. SUMMARY

Provided in this disclosure is a vehicle bumper with a main bumper having an elongated body portion. The elongated body portion has a generally rectangular cross-section. The elongated body portion also has a first end and a second end. A first rectangular mounting flange is formed integrally and perpendicularly around a periphery of the first end of the elongated body portion. A second rectangular mounting flange is formed integrally and perpendicularly around a periphery of the second end of the elongated body portion.

A first detachable light bar is provided that includes a first rectangular mating mounting flange formed integrally and perpendicularly around a periphery of the first light bar. The first rectangular mating mounting flange is detachably configured for abutting engagement with the respective first rectangular mounting flange of the main bumper. A second detachable light bar is also provided that includes a second rectangular mating mounting flange formed integrally and perpendicularly around a periphery of the second light bar. The second rectangular mating mounting flange is detachably configured for abutting engagement with the second rectangular mounting flange of the main bumper.

A pair of slots are formed along a first edge of each of the first and second rectangular mounting flanges, into which a pair of bolts are slid through from bore holes in the respective first and second mating mounting flanges. A pair of bolt holes are formed along a second edge of each of the first and second rectangular mounting flanges, opposite the first edge, into which a pair of bolts are slid through from bore holes in the respective first and second mating mounting flanges.

The first and second detachable light bars each extend away from the main bumper along an axis of the elongated body portion. One or both of the first and second detachable light bars each include at least one hole for receiving and mounting at least one customizable light. Alternatively, one or both of the first and second detachable light bars include a slanted portion formed on the opposite end of the respective light bar from the respective mating mounting flange. One or both of the first and second mounting flanges can optionally include a flat plate for covering the respective flange(s) in the event the respective detachable light bar is detached.

The vehicle bumper also includes a mounting plate formed integrally with the elongated body portion of the main bumper and having a planar mounting surface extending away from the elongated body portion. The mounting surface of the mounting plate can include a pair of standard D rings for attaching a trailer safety chain, and/or an array of mounting holes formed at different positions upon the mounting surface for bolting an interchangeable trailer hitch onto the bumper.

According to one aspect, the present invention provides a vehicle bumper that can be customized to accommodate the needs of specific users.

According to another aspect, the present invention provides a vehicle bumper that improves performance of a vehicle and provides functions not available in standard or optional factory components.

According to still another aspect, the present invention provides a vehicle bumper that can be customized without fabricating or adapting components.

According to yet another aspect, the present invention provides a vehicle bumper that can be customized without the expense associated with a time consuming and material-intensive fabricating process.

According to a further aspect, the present invention provides a vehicle bumper that complies with established safety standards.

According to another further aspect, the present invention provides a customizable vehicle bumper that can be subsequently modified to accommodate any changing needs of the end user.

Other benefits and advantages of this invention will become apparent to those skilled in the art to which it pertains upon reading and understanding of the following detailed specification.

III. BRIEF DESCRIPTION OF THE DRAWINGS

The disclosed vehicle bumper may take physical form in certain parts and arrangement of parts, embodiments of which will be described in detail in this specification and illustrated in the accompanying drawings which form a part hereof and wherein.

IV. DETAILED DESCRIPTION

Figure 1:
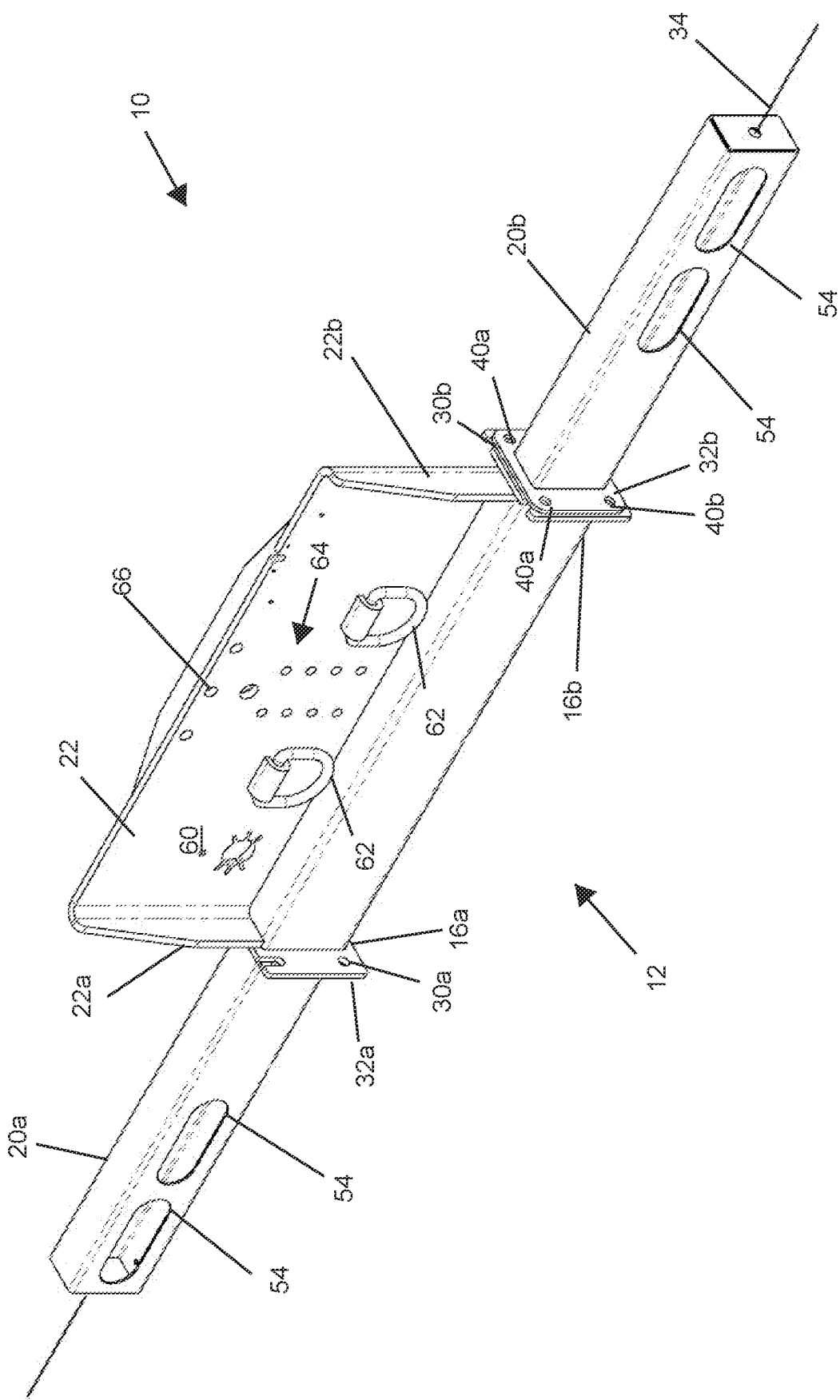
FIG. 1 is a perspective view of the vehicle bumper in accordance with an exemplary embodiment of the present invention.
Figure 2:
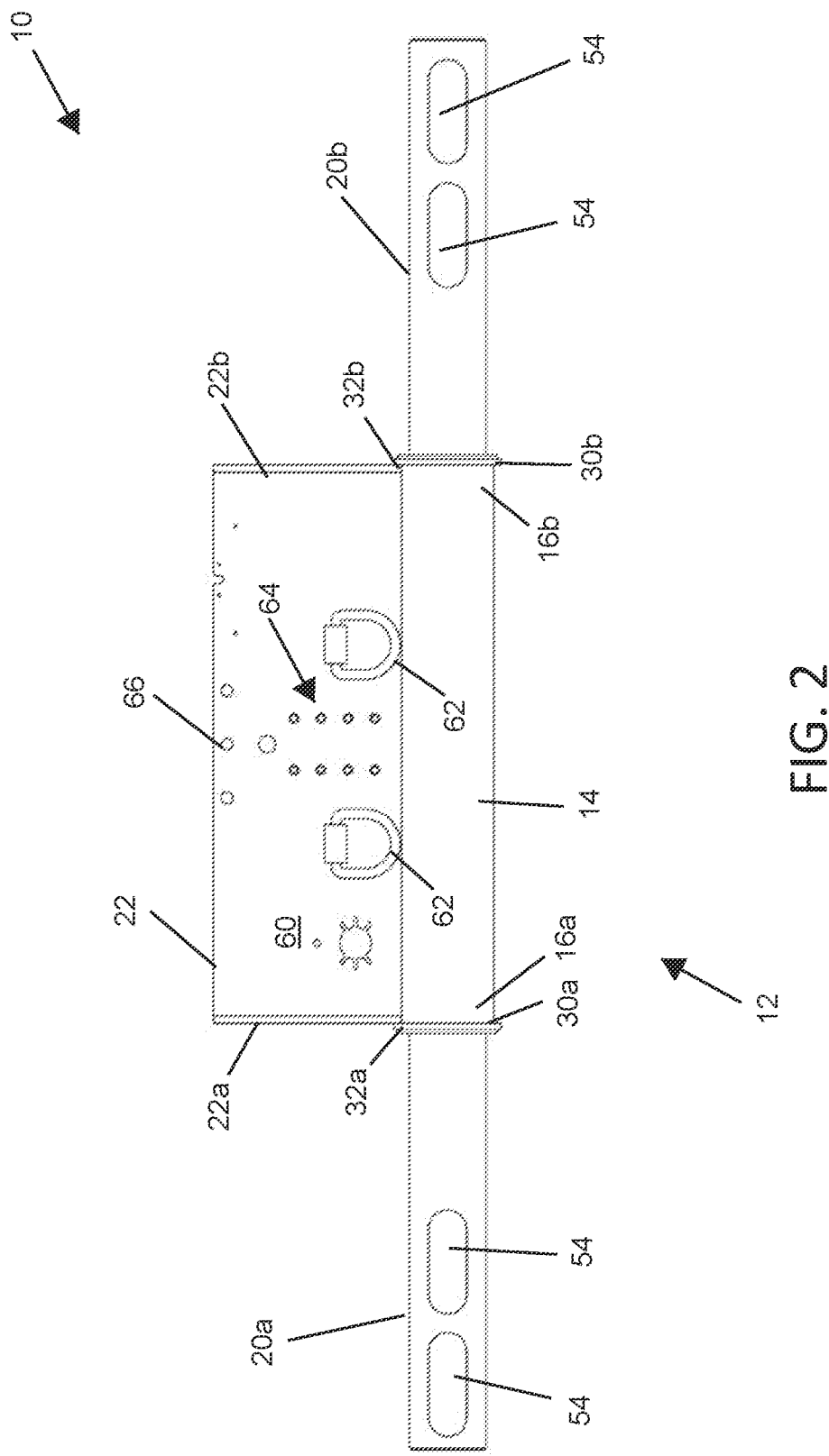
FIG. 2 is a frontal view of the vehicle bumper in accordance with the exemplary embodiment of the present invention.
Figure 3:
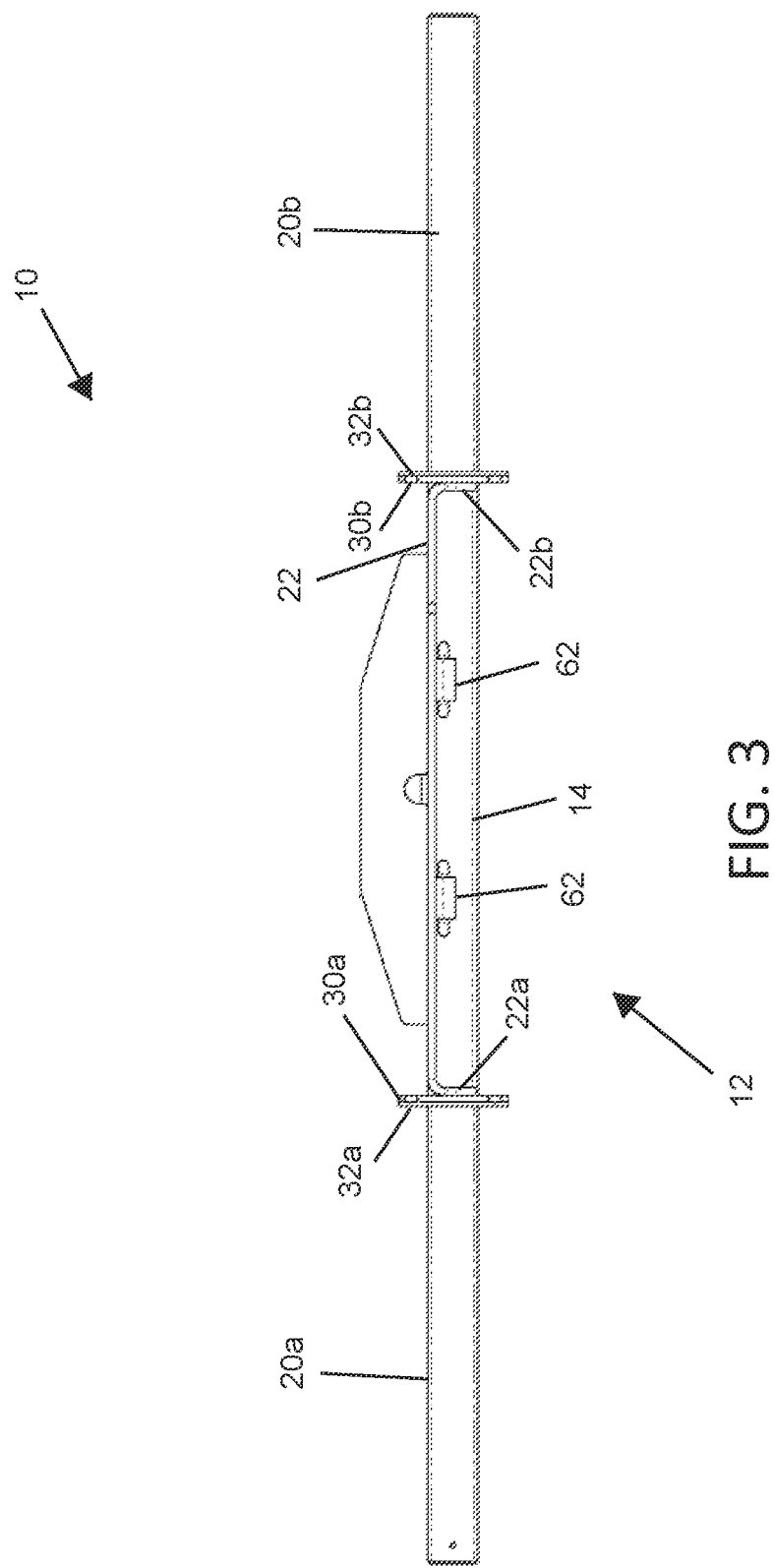
FIG. 3 is a top view of the vehicle bumper in accordance with the exemplary embodiment of the present invention.
Figure 4:
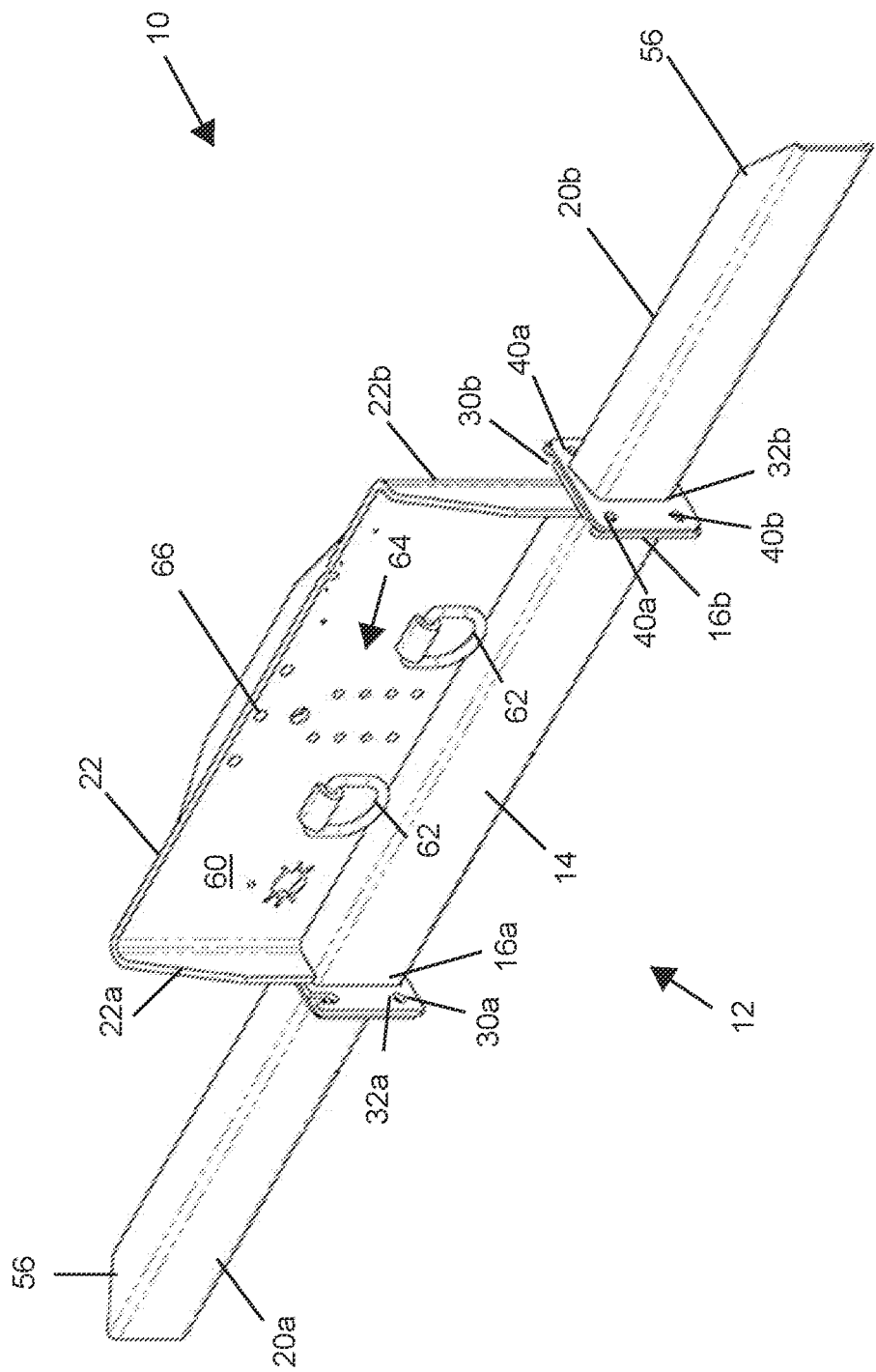
FIG. 4 is a perspective view of the vehicle bumper in accordance with an alternate exemplary embodiment of the present invention.
Figure 5:
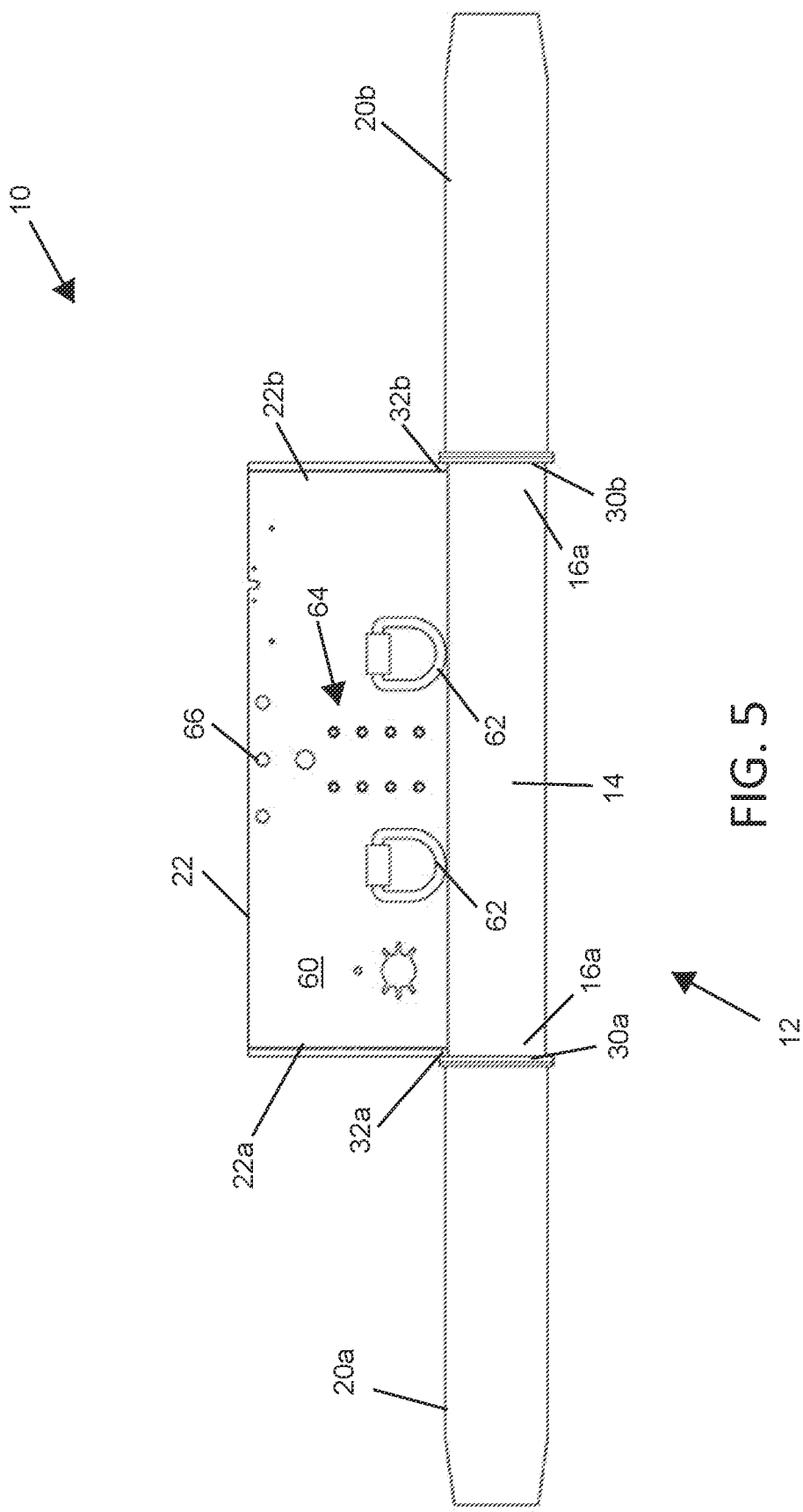
FIG. 5 is a frontal view of the vehicle bumper in accordance with the alternate exemplary embodiment of the present invention.
Figure 6:
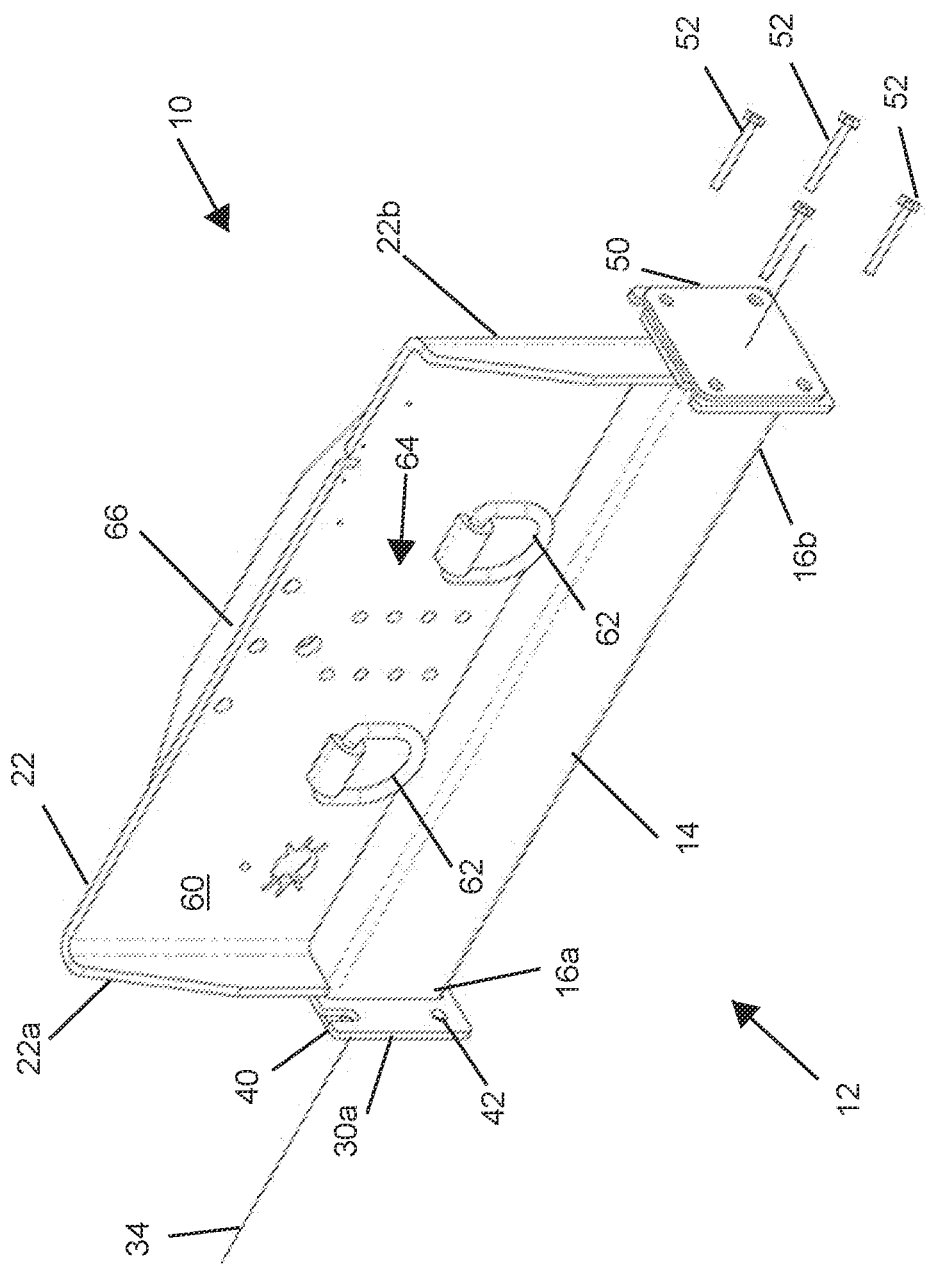
FIG. 6 is a perspective view of the elongated body portion with mounting plate of the vehicle bumper in accordance with the present invention.
Figure 7:
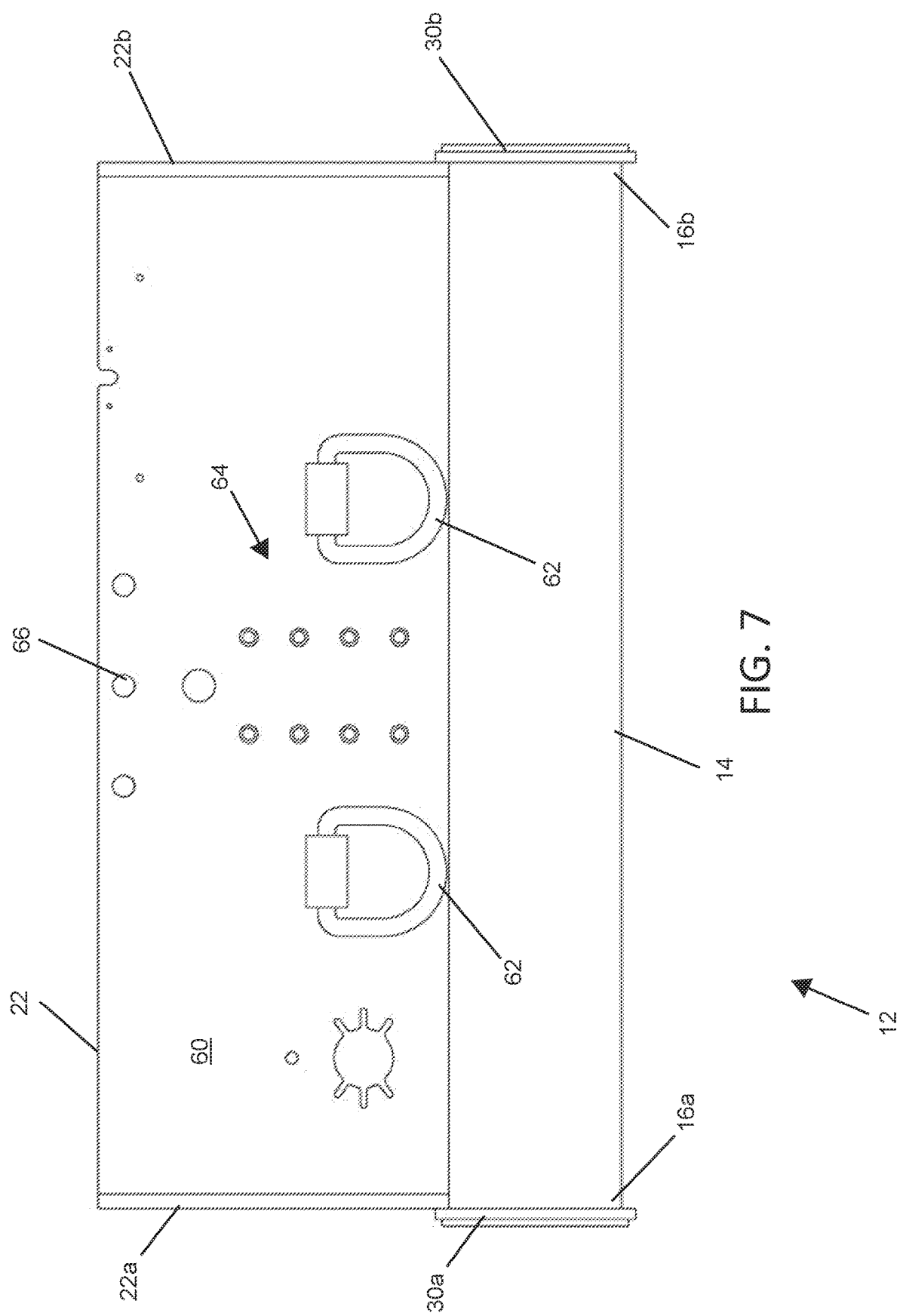
FIG. 7 is a frontal view of the elongated body portion with mounting plate of the vehicle bumper in accordance with the present invention.
Figure 8:
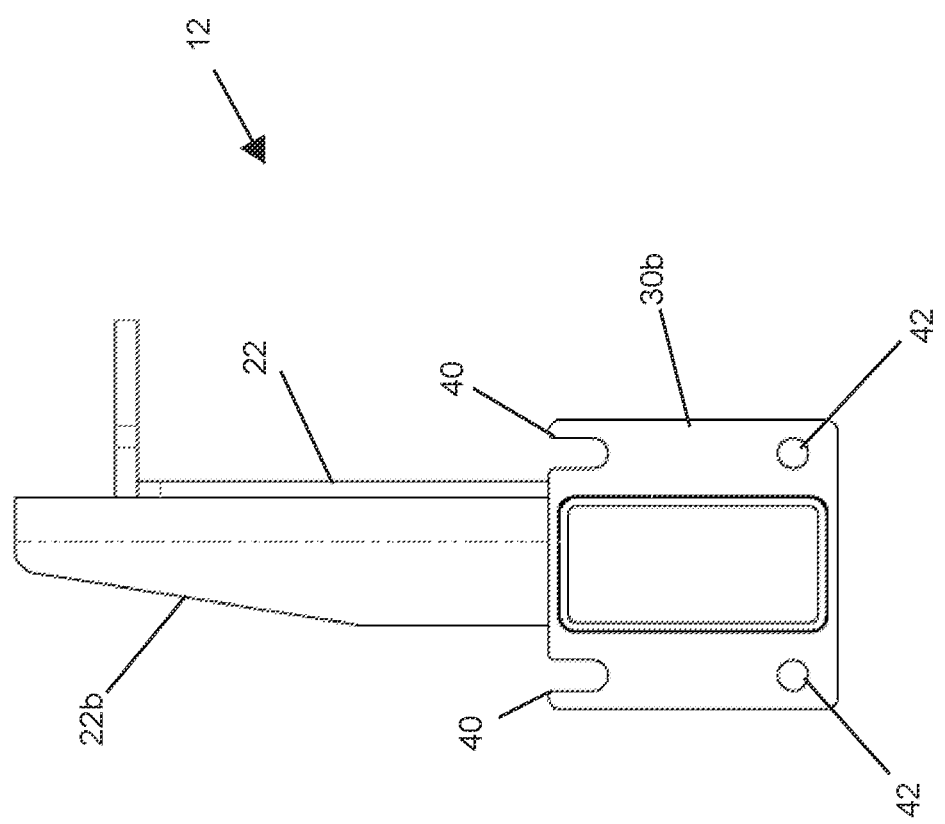
FIG. 8 is a side view of the elongated body portion with mounting plate of the vehicle bumper in accordance with the present invention.

Referring now to the drawings wherein the showings are for purposes of illustrating embodiments of the article only and not for purposes of limiting the same, and wherein like reference numerals are understood to refer to like components:

FIGS. 1, 2, and 3 depict the vehicle bumper 10 in accordance with an exemplary embodiment. FIGS. 4 and 5 depict the vehicle bumper 10 in accordance with an alternate exemplary embodiment. In both embodiments, the bumper 10 includes a main bumper 12 having an elongated body portion 14 with a first end 16a and a second end 16b. The vehicle bumper 10 also includes a first detachable light bar 20a and a second detachable light bar 20b. FIGS. 6, 7, and 8 specifically show the main bumper 12 alone, without the light bars 20a, 20b.

As shown in FIGS. 1-8, both embodiments include a mounting plate 22 formed integrally with the elongated body portion 14 of the main bumper 12. The mounting plate 22 includes a planar mounting surface 60 extending away from the elongated body portion 14. The mounting plate 22 can be integrally formed with the elongated body portion 14 via welding or other suitable type of bonding or other securement. Various additional aspects of the mounting plate 22 will be disclosed in greater detail hereinbelow.

With reference to FIGS. 1-8, particularly FIGS. 6-8, the elongated body portion 14 includes a first mounting flange 30a and a second mounting flange 30b. The first and second mounting flanges 30a, 30b are formed integrally with the respective first and second ends 16a, 16b of the elongated body portion 14. The mounting flanges 30a, 30b can be integrally formed with the elongated body portion 14 via welding or other suitable type of bonding or other securement.

With particular reference to FIGS. 1-5, the first detachable light bar 20a and the second detachable light bar 20b are both detachable from the main bumper 12 and include mating mounting flanges 32a, 32b for attaching to the main bumper 12. The first light bar 20a includes a first mating mounting flange 32a and the second light bar 20b includes a second mating mounting flange 32b. These first and second mating mounting flanges 32a, 32b are configured for detachable engagement with the respective first and second mounting flanges 16a, 16b of the main bumper.

As shown in FIGS. 1-8, particularly FIGS. 6-8, the elongated body portion 14 of the main bumper 12 has a generally rectangular shape and thereby includes a generally rectangular cross section. The first and second mounting flanges 30a, 30b are formed as respective first and second rectangular peripheral portions that are perpendicular to an axis 34 running through the center of the length direction of the elongated body portion 14 and thus the entire vehicle bumper 10. The mating mounting flanges 32a, 32b on the first and second light bars 20a, 20b are similarly formed as respective first and second rectangular peripheral portions that are perpendicular to the axis 34 of the vehicle bumper 10. In this manner the first and second mounting flanges 30a, 30b of the elongated body portion 14 have first and second facing sides that abut first and second facing sides on the respective first and second mating peripheral portions on the respective first and second mating mounting flanges 32a, 32b of the first and second light bars 20a, 20b.

As particularly seen in FIGS. 6-8, apertures are formed at each respective corner of the first and second mounting rectangular peripheral portions of the first and second mounting flanges 30a, 30b. These apertures are formed in the mounting flanges 30a, 30b in order to receive bolts extending through from the respective first and second mating mounting flanges 32a, 32b of the first and second light bars 20a, 20b. While any suitable shape apertures could be formed in the mounting flanges 30a, 30b, in the preferred embodiment the apertures particularly include a pair of slots 40 into which a pair of bolts are slid from the respective first and second mating mounting flanges 32a, 32b. The apertures also include a pair of bolt holes 42 into which another pair of bolts are extended from the respective first and second mating mounting flanges 32a, 32b. In the preferred embodiment, each of the pair of slots 40 are vertical slots formed near the corners inwards from a top edge of the respective mounting flange 30a, 30b, where the "top edge" is the upwardly vertical edge when the bumper is installed in its operative position.

As follows from the FIGS. 1 and 4, the slots 40 greatly facilitate the assembly of the light bars 20a, 20b to the main bumper 12. The mating mounting flanges 32a, 32b of the light bars 20a, 20b each include bore holes for receiving bolts. In operation, two bolts are inserted into the two top bore holes 40a formed along the top edge of the mating mounting flanges 32a, 32b. When the light bars 20a, 20b are abutted to the main bumper 12, the bolts are then readily dropped into the vertical slots 40 of the mounting flanges 16a, 16b, so that the mating mounting flanges 32a, 32b are readily aligned with the mounting flanges 30a, 30b. The bolts can then be secured with suitable nuts to hold the light bars 20a, 20b in place against the main bumper 12. Afterwards, two more bolts can be inserted into the two bottom bore holes 40b formed along the bottom edge of the mating mounting flanges 32a, 32b, which are already aligned with the mounting flanges 30a, 30b, and are then readily secured with nuts. Thus, the vertical slots 40 facilitate and simplify a light bar assembly operation, which can be performed by one person instead of requiring one person to hold the light bar in alignment with the main bumper while another person inserts bolts in four corner holes.

As indicated in FIG. 6, a customizable bumper design may be contemplated in which one or both light bars 20a, 20b remain detached from the main bumper 12. In this instance, one or both of the first and second mounting flanges 30a, 30b are enclosed by a flat plate 50 for covering the respective flange 30a, 30b if the respective detachable light bar 20a, 20b is detached. The flat plate 50 is secured with bolts 52, which can be the same bolts used to secure the light bar. The flat plate 50 prevents dirt and moisture from entering into the hollow elongated body portion 14.

With reference to FIGS. 1-5, the first and second detachable light bars 20a, 20b can be of any suitable configuration for installing one or more lights to the vehicle bumper 10. In the preferred embodiment the light bars 20a, 20b are elongated members that each extend away from the main bumper 12 along the axis 34 of the elongated body portion 14. As shown particularly in the exemplary embodiment of FIGS. 1-3, one or both of the first and second detachable light bars 20a, 20b include one or more holes 54 for receiving and mounting at least one customizable light to the vehicle bumper 12. As shown particularly in the alternate exemplary embodiment of FIGS. 4 and 5, one or both of the first and second detachable light bars 20a, 20b include a slanted portion 56, formed on the end of the light bars 20a, 20b, where the end of the light bar includes chamfered edges tapered from the front to the back for aesthetics and ergonomic safety.

As generally shown in FIGS. 1-8, the mounting plate 22 includes two angled portions 22a, 22b, perpendicular to the plane of the mounting surface 60 of the mounting plate 22, for providing mechanical strength and secure attachment to the elongated body portion 14. The mounting surface 60 of the mounting plate 22 preferably includes a pair of standard D rings 62 for attaching a trailer safety chain. The mounting surface 60 of the mounting plate 22 also preferably includes an array of mounting holes 64 formed at different positions upon the mounting surface 60 for selectively bolting an interchangeable trailer hitch or pintle type hitch (not shown) onto the bumper at a desired position, enabling a selection of hitch heights and types to suit the needs of the end user. The mounting surface can also include a series of additional holes 66 for mounting any other selected items, such as a license plate or any other accessories.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. A vehicle bumper, comprising:
   a main bumper having an elongated body portion with a first end and a second end;
   a mounting plate formed integrally with the elongated body portion of the main bumper and having a planar mounting surface extending away from the elongated body portion;
   a first mounting flange and a second mounting flange, wherein the first and second mounting flanges are formed integrally with the respective first and second ends of the elongated body portion; and
   a first detachable light bar and a second detachable light bar, wherein the first light bar includes a first mating mounting flange and wherein the second light bar includes a second mating mounting flange, wherein the first and second mating mounting flanges are configured for detachable engagement with the respective first and second mounting flanges of the main bumper.

2. The vehicle bumper of claim 1, wherein the elongated body portion of the main bumper comprises a generally rectangular cross section.

3. The vehicle bumper of claim 1, wherein the mounting surface of the mounting plate comprises a pair of standard D rings for attaching a trailer safety chain.

4. The vehicle bumper of claim 1, wherein the mounting surface of the mounting plate comprises an array of mounting holes formed at different positions upon the mounting surface for bolting an interchangeable trailer hitch onto the bumper.

5. The vehicle bumper of claim 1, wherein the first and second mounting flanges each comprise respective first and second rectangular peripheral portions that abut respective first and second mating rectangular peripheral portions on the respective first and second mating mounting flanges of the first and second light bars.

6. The vehicle bumper of claim 5, further comprising respective apertures at each respective corner of the first and second mounting rectangular peripheral portions of the first and second mounting flanges, in order to receive bolts extending from the respective first and second mating mounting flanges of the first and second light bars.

7. The vehicle bumper of claim 6, wherein the respective apertures comprise:
   a pair of slots into which a pair of bolts are slid from the respective first and second mating mounting flanges; and
   a pair of bolt holes into which a pair of bolts are extended from the respective first and second mating mounting flanges.

8. The vehicle bumper of claim 1, wherein at least one of the first and second mounting flanges comprise a flat plate for covering the respective flange if the respective detachable light bar is detached.

9. The vehicle bumper of claim 1, wherein the first and second detachable light bars each extend away from the main bumper along an axis of the elongated body portion.

10. The vehicle bumper of claim 1, wherein at least one of the first and second detachable light bars comprise at least one hole for receiving and mounting at least one customizable light.

11. The vehicle bumper of claim 1, wherein at least one of the first and second detachable light bars comprise a slanted portion formed on an opposite end of the respective light bar from the respective mating mounting flange.

12. A vehicle bumper, comprising:
   a main bumper having an elongated body portion having a generally rectangular cross-section and having a first end and a second end;
   a first rectangular mounting flange and a second rectangular mounting flange, wherein the first and second rectangular mounting flanges are formed integrally and perpendicularly around a periphery of the respective first and second ends of the elongated body portion; and
   a first detachable light bar including a first rectangular mating mounting flange formed integrally and perpendicularly around a periphery of the first light bar, wherein the first rectangular mating mounting flange is configured for detachable abutting engagement with the respective first rectangular mounting flange of the main bumper;
   a second detachable light bar including a second rectangular mating mounting flange formed integrally and perpendicularly around a periphery of the second light bar, wherein the second rectangular mating mounting flange is configured for detachable abutting engagement with the second rectangular mounting flange of the main bumper;

a pair of slots formed along a first edge of each of the first and second rectangular mounting flanges, into which a pair of bolts are slid through from bore holes in the respective first and second mating mounting flanges; and a pair of bolt holes formed along a second edge of each of the first and second rectangular mounting flanges, opposite the first edge, into which a pair of bolts are slid through from bore holes in the respective first and second mating mounting flanges.

13. The vehicle bumper of claim 12, wherein at least one of the first and second mounting flanges comprise a flat plate for covering the respective flange if the respective detachable light bar is detached.

14. The vehicle bumper of claim 12, wherein the first and second detachable light bars each extend away from the main bumper along an axis of the elongated body portion.

15. The vehicle bumper of claim 12, wherein at least one of the first and second detachable light bars comprise at least one hole for receiving and mounting at least one customizable light.

16. The vehicle bumper of claim 12, wherein at least one of the first and second detachable light bars comprise a slanted portion formed on an opposite end of the respective light bar from the respective mating mounting flange.

17. The vehicle bumper of claim 12, further comprising a mounting plate formed integrally with the elongated body portion of the main bumper and having a planar mounting surface extending away from the elongated body portion, wherein the mounting surface of the mounting plate comprises:
a pair of standard D rings for attaching a trailer safety chain; and
an array of mounting holes formed at different positions upon the mounting surface for bolting an interchangeable trailer hitch onto the bumper.

18. A vehicle bumper, comprising:
a main bumper having an elongated body portion having a generally rectangular cross-section with a first end and a second end;
a mounting plate formed integrally with the elongated body portion of the main bumper and having a planar mounting surface extending away from the elongated body portion, wherein the mounting surface of the mounting plate comprises,
a pair of standard D rings for attaching a trailer safety chain, and
an array of mounting holes formed at different positions upon the mounting surface for bolting an interchangeable trailer hitch onto the bumper;
a first rectangular mounting flange and a second rectangular mounting flange, wherein the first and second rectangular mounting flanges are formed integrally and perpendicularly around a periphery of the respective first and second ends of the elongated body portion; and
a first detachable light bar, wherein the first light bar includes a first rectangular mating mounting flange formed integrally and perpendicularly around a periphery of the first light bar, wherein the first rectangular mating mounting flange is detachably configured for abutting engagement with the respective first rectangular mounting flange of the main bumper, for extending away from the main bumper along an axis of the elongated body portion;
a second detachable light bar, wherein the second light bar includes a second rectangular mating mounting flange formed integrally and perpendicularly around a periphery of the second light bar, wherein the second rectangular mating mounting flange is detachably configured for abutting engagement with the second rectangular mounting flange of the main bumper, for extending away from the main bumper along an axis of the elongated body portion;
a pair of vertical slots formed along a top edge of each of the first and second rectangular mounting flanges, into which a pair of bolts are slid through from bore holes in the respective first and second mating mounting flanges; and
a pair of bolt holes formed along a bottom edge of each of the first and second rectangular mounting flanges, opposite the first edge, into which a pair of bolts are slid through from bore holes in the respective first and second mating mounting flanges.

\* \* \* \* \*